(12) United States Patent
Huang

(10) Patent No.: US 6,781,440 B2
(45) Date of Patent: Aug. 24, 2004

(54) CHARGE PUMP CIRCUIT WITH VOLTAGE MULTIPLIER FOR BOOSTING CLOCK SIGNAL AND METHOD THEREOF

(75) Inventor: Chung-Meng Huang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 10/234,891

(22) Filed: Sep. 4, 2002

(65) Prior Publication Data

US 2003/0155963 A1 Aug. 21, 2003

(30) Foreign Application Priority Data

Feb. 18, 2002 (TW) ........................................ 91102713 A

(51) Int. Cl.[7] ................................................ G05F 3/24
(52) U.S. Cl. ......................... 327/537; 327/536; 363/60
(58) Field of Search ................................ 327/536, 537; 363/57, 60; 365/189.09, 226

(56) References Cited

U.S. PATENT DOCUMENTS 5,748,032 A * 5/1998 Baek ........................... 327/536
6,157,242 A * 12/2000 Fukui .......................... 327/536
6,160,723 A * 12/2000 Liu .............................. 363/60
6,483,728 B1 * 11/2002 Johnson et al. ................ 363/60
6,486,729 B2 * 11/2002 Imamiya ..................... 327/536

* cited by examiner

Primary Examiner—Timothy P. Callahan
Assistant Examiner—Terry L. Englund
(74) Attorney, Agent, or Firm—Volpe and Koenig, P.C.

(57) ABSTRACT

A charge pump circuit is provided. The charge pump circuit includes a plurality of voltage-boosting stages connected in series with each other and having a supply terminal, a control terminal, and an output terminal respectively, and a plurality of voltage multipliers, each multiplier having an input terminal, a first output terminal for outputting a first clock signal, and a second output terminal for outputting a second clock signal respectively, wherein the input terminal of a first voltage multiplier is coupled to a clock signal, a magnitude of the first clock signal is a multiple of a magnitude of the second clock signal, each of the voltage multipliers is coupled the respective second output terminal thereof to the input terminal of a downstream voltage multiplier, and the first output terminal of the voltage multiplier is coupled to the control terminal of a respective one of the voltage-boosting stages.

11 Claims, 3 Drawing Sheets

US 6,781,440 B2

CHARGE PUMP CIRCUIT WITH VOLTAGE MULTIPLIER FOR BOOSTING CLOCK SIGNAL AND METHOD THEREOF

FIELD OF THE INVENTION

This invention relates to a voltage generating circuit, and more particular to a charge pump circuit with a voltage multiplier for boosting a clock signal to generate higher output voltages.

BACKGROUND OF THE INVENTION

Charge pump circuit is used for generating a higher output voltage when inputting a voltage regularly, and they have been used in non-volatile memory, such as EEPROM (Electrically Erasable Programmable Read-Only Memory) and flash memory, for programming and erasing operations through their floating gates. Thus, the flash memory can finish three kinds of basic operations, in another word, reading (a byte or word), writing (a byte or word), and erasing (a byte or word) operations.

Please refer to FIG. 1. FIG 1 shows a conventional four-stage Dickson charge pump circuit. As shown in FIG. 1, the charge pump circuit 100 includes four voltage-boosting stages 101, 102, 103, and 104 connected series between an input node 105 and an output node 109. Voltage-boosting stages 101, 102, 103, and 104 have supply terminals, control terminals 110, 111, 112, and 113, and output terminals respectively. Also, the voltage-boosting stages form three voltage nodes 106, 107, and 108 respectively for coupling to each other. Each voltage-boosting stage 101, 102, 103, and 104 includes a MOS (Metal-Oxide-Semiconductor) transistor which has a gate terminal for coupling to its drain terminal to form a diode-coupled transistor 118, 119, 120, and 121 respectively. In the Dickson charge pump circuit 100, the voltage-boosting stage 101 includes a capacitor 114 that one terminal of the capacitor 114 is the control terminal 110 for receiving a clock signal CLK, and other terminal thereof is coupled to the input node 105. The voltage-boosting stage 102 includes a capacitor 115 that one terminal of the capacitor 115 is the control terminal 111 for receiving an inverse signal $\overline{CLK}$ of the clock signal CLK, and the other terminal thereof is coupled to the input node 106. The voltage-boosting stage 103 includes a capacitor 116 that one terminal of the capacitor 116 is the control terminal 112 for receiving the clock signal CLK, and the other terminal thereof is coupled to the input node 107. The voltage-boosting stage 104 includes a capacitor 117 that one terminal of the capacitor 117 is the control terminal 113 for receiving the inverse signal $\overline{CLK}$ of the clock signal CLK, and the other terminal thereof is coupled to the input node 108. Then, the diode-coupled transistor 118 operates as an unidirectional switch to transfer the charge stored on the capacitor 114 to the capacitor 115. Also, the diode-coupled transistor 119 operates as an unidirectional switch to transfer the charge stored on the capacitor 115 to the capacitor 116, the diode-coupled transistor 120 operates as an unidirectional switch to transfer the charge stored on the capacitor 116 to the capacitor 117, and the diode-coupled transistor 121 operates as an unidirectional switch to transfer the charge stored on the capacitor 117 to an output capacitor $C_{out}$.

The Dickson charge pump circuit 100 further includes a diode-coupled transistor 122. The diode-coupled transistor 122 is coupled between an input voltage $V_{DD}$ and the input node 105 and is also operated as a unidirectional switch to transfer the charge of the input voltage $V_{DD}$ to the capacitor 114.

However, the transformation of the charge is decided by a voltage difference between the supply terminal and the output terminal in the voltage-boosting stage. If the voltage difference is higher than a threshold voltage of the diode-coupled transistor, the charge can be transferred. Moreover, the Dickson charge pump circuit utilizes the clock signal CLK and the inverse signal $\overline{CLK}$ of the clock signal CLK to increase the voltage in the node. In an n-stage Dickson charge pump circuit, an output voltage $V_{out}$ can be obtained by $$V_{out} = V_{DD} + \Delta V - \sum_{k=1}^{n} V_{th}(V_k)$$

$$\Delta V = V_{DD}\frac{C}{C+C_s} - \frac{I_{out}}{f(C+C_s)}$$

Where $V_{DD}$ is a logic high voltage value of the clock signal, $V_{th}$ is a threshold voltage of each MOS, C is a capacitance of each voltage-boosting stage's capacitor, $C_s$ is a stray capacitance at each node, f is a frequency of the clock signal, and $I_{out}$ is an output current loading.

Hence the necessary condition for the charge pump circuit to work is $\Delta V > V_{th}$.

However, because the body effect of the transistor increases the threshold voltage and the input voltage is lower than 1.8 V, the clock signal cannot increase a sufficient voltage at the node to overcome the threshold voltage.

Because of the technical defects described above, the applicant keeps on carving unflaggingly to develop "charge pump circuit with voltage multiplier for boosting clock signal and method thereof" through wholehearted experience and research.

SUMMARY OF THE INVENTION

It is an object of the present invention to provide a charge pump circuit with a voltage multiplier for boosting a clock signal and a method thereof.

It is another object of the present invention to provide a charge pump circuit that includes a plurality of voltage-boosting stages and a plurality of voltage multipliers.

It is further another object of the present invention to provide the voltage multipliers for boosting a clock signal to amplify a voltage at each connecting node between a plurality of voltage-boosting stages and provide a stable output voltage.

The present invention provides a charge pump circuit that includes a plurality of voltage-boosting stages connected in series with each other and each of which has a supply terminal, a control terminal, and an output terminal respectively, and a plurality of voltage multipliers, each of which has an input terminal, a first output terminal for outputting a first clock signal, and a second output terminal for outputting a second clock signal, a magnitude of the first clock signal is a multiple of that of the second clock signal, the second output terminal of a respective one of the voltage multipliers excluding a last one thereof is coupled to the input terminal of a downstream voltage multiplier, and the first output terminal of a respective one of the voltage multipliers is coupled to the control terminal of a respective one of the voltage-boosting stages.

Preferably, the first clock signal and the respective clock signal, coupled to the respective voltage multiplier, are two out-of-phase signals.

Preferably, the second clock signal and the respective clock signal, coupled to the respective voltage multiplier, are two out-of-phase signals.

Preferably, the voltage-boosting stage stages includes a switching circuit having a first signal terminal, a second signal terminal, and a control terminal, wherein the second signal terminal is coupled to the first signal terminal of a downstream the switching circuit, and an energy storage circuit having a first terminal coupled to the second signal terminal and a second terminal as the control terminal of the voltage-boosting stage.

Certainly, the switching circuit includes an N-Type MOS (Metal-Oxide-Semiconductor) transistor.

Certainly, the energy storage circuit includes a capacitor.

Preferably, each stage of the plurality of voltage-boosting stages includes a MOS transistor having a gate coupled to a drain for forming a diode-coupled transistor.

Preferably, each of the voltage multipliers is a voltage doubler.

Preferably, each of the voltage multipliers includes an inverting amplifier having an input terminal as the input terminal of the voltage multiplier and an output terminal as the second output terminal of the voltage multiplier, a first P-type MOS transistor having a gate terminal, a first conducting terminal, and a second conducting terminal, wherein the first conducting terminal is coupled to a power source, a second P-type MOS transistor having a gate terminal coupled to the input terminal of the voltage multiplier, a first conducting terminal coupled to the first conducting terminal of the first P-type MOS transistor, and a second conducting terminal coupled to the first output terminal of the voltage multiplier, a capacitor coupled to the second conducting terminal of the first P-type MOS transistor and the output terminal of the inverting amplifier, and an N-type MOS transistor having a gate terminal coupled to the input terminal of the voltage multiplier, a first conducting terminal coupled to the gate terminal of the first P-type MOS transistor and the second conducting terminal of the second P-type MOS transistor, and a second conducting terminal.

In accordance with another aspect of the present invention, a method for controlling a charge pump circuit to generate a boosted voltage on an output node of the charge pump circuit, the charge pump circuit having an input node coupled to a voltage, a plurality of voltage-boosting stages, each of which includes a supply terminal, a control terminal and an output terminal, coupled in series between the input and output nodes, includes the steps of applying a respective clock signal, switching the respective clock signal into a respective first clock signal for being coupled to the control terminal of a respective voltage-boosting stage, switching the respective clock signal into a respective second clock signal, and coupling the respective second clock signal to the control terminal of the respective voltage-boosting stages.

Preferably, the first clock signal and the respective clock signal are two out-of-phase signals.

Preferably, the second clock signal and the respective clock signal are two out-of-phase signals.

Preferably, the third clock signal and the second clock signal are two out-of-phase signals.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
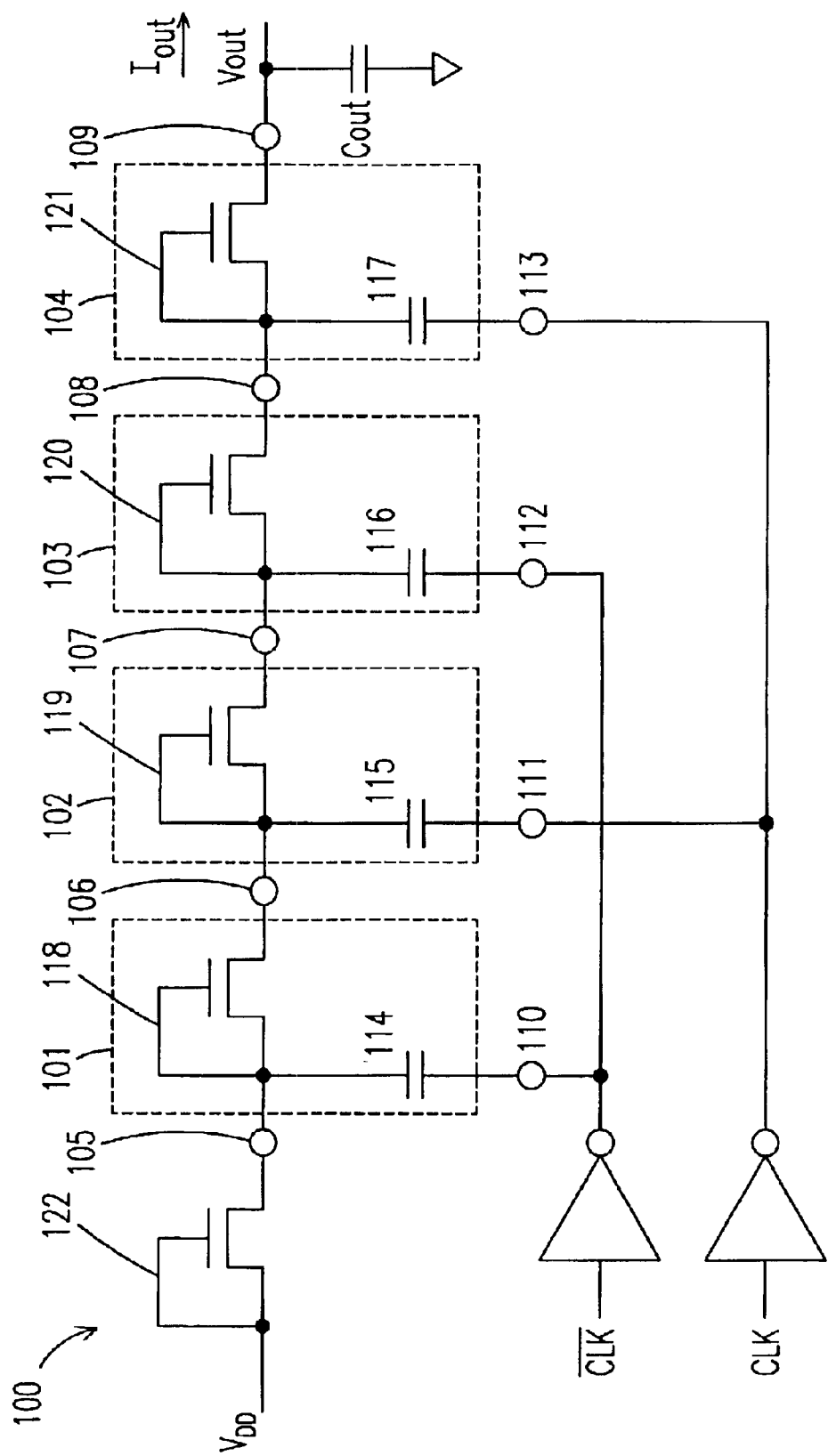
FIG. 1 shows a schematical view of a conventional four-stage Dickson charge pump circuit.
Figure 2:
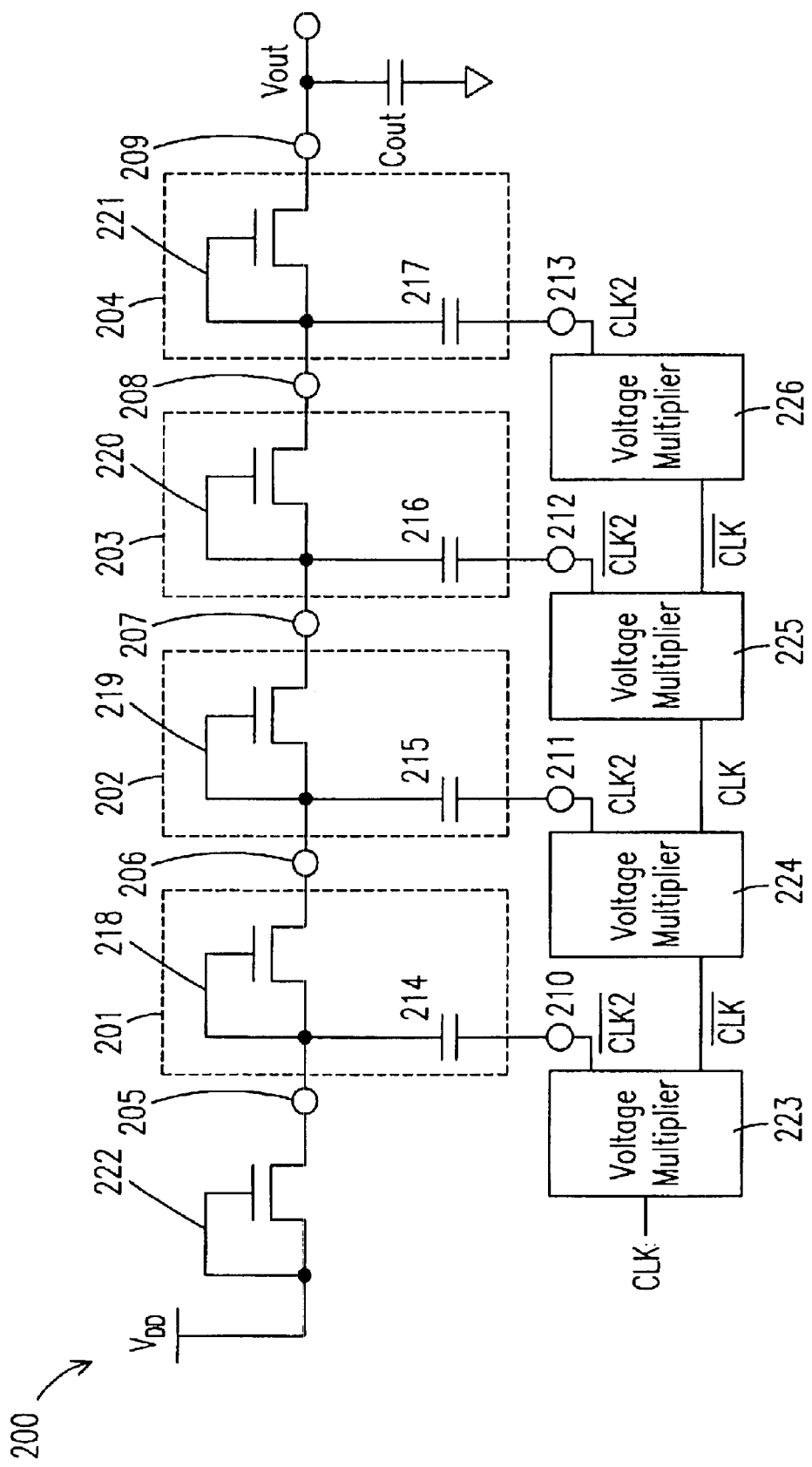
FIG. 2 shows a block diagram of a charge pump circuit with a voltage multiplier for boosting clock signals according to one preferred embodiment of the present invention.

Please refer to FIG. 2. FIG. 2 illustrates a block diagram of the charge pump circuit with a voltage multiplier for boosting clock signals according to one preferred embodiment of the present invention. As shown in FIG. 2, a four-stage charge pump circuit 200 includes four voltage-boosting stages 201, 202, 203, and 204 connected series between an input node 205 and an output node 209. Voltage-boosting stages 201, 202, 203, and 204 have supply terminals, control terminals 210, 211, 212, and 213, and output terminals. And voltage-boosting stages 201, 202, 203, and 204 form three voltage nodes 206, 207, and 208 respectively for coupling to each other. Moreover, each voltage-boosting stage 201, 202, 203, and 204 includes a MOS transistor which has a gate terminal for coupling to a drain terminal to form diode-coupled transistors 218, 219, 220, and 221 respectively.

The charge pump circuit 200 includes four voltage multipliers 223, 224, 225, and 226, and each of which has an input terminal, a first output terminal, and a second output terminal. Voltage multipliers 223, 224, 225, and 226 couple in series through the second output terminal. The input terminal of the voltage multiplier 223 is coupled to a clock signal CLK and then the first output terminal thereof outputs a first clock signal, and the second output terminal thereof outputs a second clock signal, wherein the first clock signal is a multiple signal of the second clock signal. The first output terminal of the voltage multiplier 223 is coupled to the control terminal 210 of the voltage-boosting circuit 201, the first output terminal of the voltage multiplier 224 is coupled to the control terminal 211 of the voltage-boosting circuit 202, the first output terminal of the voltage multiplier 225 is coupled to the control terminal 212 of the voltage-boosting circuit 203, and the first output terminal of the voltage multiplier 226 is coupled to the control terminal 213 of the voltage-boosting circuit 204.

Furthermore, the voltage-boosting circuit 201 includes a capacitor 214. One terminal of the capacitor 214 is the control terminal 210 for receiving an inverse signal $\overline{CLK2}$ of a multiple clock signal, and the other thereof is coupled to the input node 205. The voltage-boosting circuit 202 includes a capacitor 215. One terminal of the capacitor 215 is the control terminal 211 for receiving the multiple clock signal CLK2 of the clock signal CLK, and the other thereof is coupled to the input node 206. The voltage-boosting circuit 203 includes a capacitor 216. One terminal of the capacitor 216 is the control terminal 212 for receiving an inverse signal $\overline{CLK2}$ of the multiple clock signal CLK2, and the other thereof is coupled to the input node 207. The voltage-boosting circuit 204 includes a capacitor 217. One terminal of the capacitor 217 is the control terminal 213 for receiving the multiple clock signal CLK2, and the other thereof is coupled to the input node 208. In addition, the diode-coupled transistor 218 operates as an unidirectional switch 218 to transfer the charge stored on the capacitor 214 to the capacitor 215. Also, the diode-coupled transistor 219 operates as an unidirectional switch to transfer the charge stored on the capacitor 215 to the capacitor 216, the diode-coupled transistor 220 operates as an unidirectional switch to transfer the charge stored on the capacitor 216 to the capacitor 217, and the diode-coupled transistor 221 operates as an unidirectional switch to transfer the charge stored on the capacitor 217 to an output capacitor $C_{out}$.

The charge pump circuit 200 further includes a diode-coupled transistor 222. The diode-coupled transistor 222 is coupled between an input voltage $V_{DD}$ and the input node 205 and is also operated as an unidirectional switch to transfer the charge of the input voltage $V_{DD}$ to the capacitor 214.

Hence, according to an aspect of the present invention, it utilizes a voltage multiplier to increase the voltages on the nodes to overcome the increase of a threshold voltage which is increased by the body effect of the transistor even while the input voltage is lower than 1.8 V, so that the input voltage can successfully be transferred to the output voltage.

Figure 3:
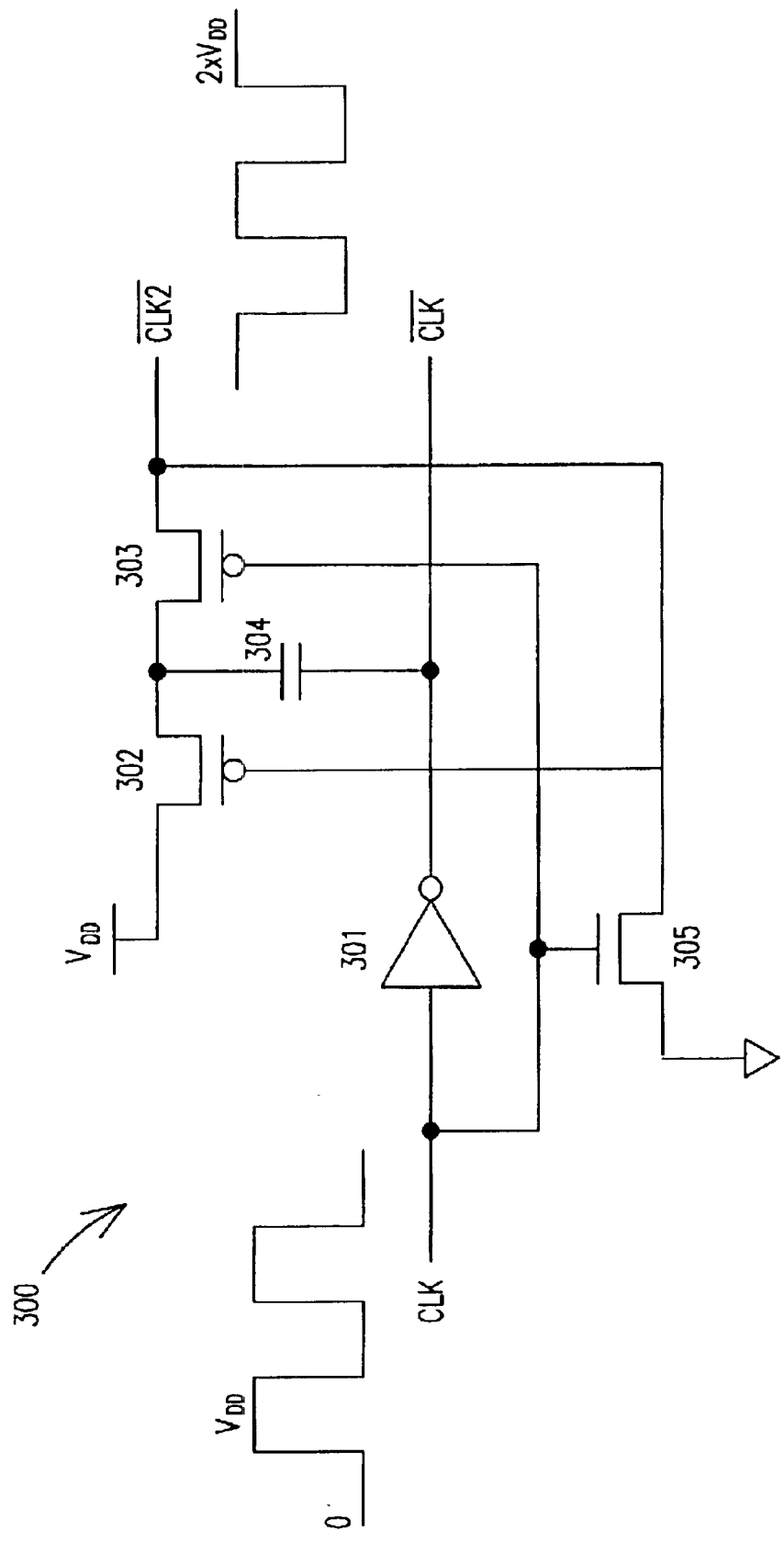
FIG. 3 shows a schematical view of a voltage doubler circuit according to the other preferred embodiment of the present invention.

Please refer to FIG. 3. FIG. 3 illustrates a schematical view of the voltage doubler circuit according to the other preferred embodiment of the present invention. As shown in FIG. 3, a voltage doubler 300 includes an inverting amplifier 301, a first PMOS (P-type Metal-Oxide-Semiconductor) transistor 302, a second PMOS transistor 303, a capacitor 304, and an NMOS (N-type Metal-Oxide-Semiconductor) transistor 305.

Among these, the inverting amplifier 301 has an input terminal as the input terminal of the voltage doubler and an output terminal as the second output terminal of the voltage doubler. The first PMOS transistor 302 has a gate terminal, a first conducting terminal, and a second conducting terminal wherein the first conducting terminal is coupled to the input voltage $V_{DD}$. The second PMOS transistor 303 has a gate terminal, a first conducting terminal, and a second conducting terminal wherein the first conducting terminal is coupled to the second conducting terminal of the first PMOS transistor 302, the gate terminal is coupled to the input terminal of the voltage doubler, and the second conducting terminal is coupled to the first output terminal of the voltage doubler. The NMOS transistor 305 has a gate terminal, a first conducting terminal, and a second conducting terminal wherein the gate terminal is coupled to the input terminal of the voltage doubler 300, the first conducting terminal is coupled to the gate terminal of the first PMOS transistor 302 and the second conducting terminal of the second PMOS transistor 303.

Suppose that the input terminal of the voltage doubler receives the clock signal CLK, the second output terminal will output an inverse signal $\overline{CLK}$ of the clock signal. And, when the voltage of the clock signal is $V_{DD}$, the NMOS transistor 305 can be conducted and the second PMOS transistor 303 can not be conducted, so that the first PMOS transistor 302 can be conducted and the capacitor 304 can be charged by the input voltage $V_{DD}$. When the voltage of the clock signal is changed to 0 V, the capacitor 304 has a voltage $V_{DD}$ to generate the inverse signal $\overline{CLK2}$ of the double voltage clock signal CLK2 at the first output terminal through the inverse signal $\overline{CLK}$ outputted by the inverting amplifier 301.

In view of the aforesaid, the present invention provides a charge pump circuit with voltage multiplier for boosting clock signal and a method thereof for utilizing a voltage multiplier to amplify a clock signal, so as to generate a sufficient voltage on the nodes to overcome a threshold voltage which is increased by the body effect of a transistor. Consequently, the conventional defect of the charge pump circuit can be improved, and the research purpose of the present invention can be achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A charge pump circuit, comprising:
  a plurality of voltage-boosting stages connected in series with each other and each of which has a supply terminal, a control terminal, and an output terminal respectively; and
  a plurality of voltage multipliers, each of which has an input terminal, a first output terminal for outputting a first clock signal, and a second output terminal for outputting a second clock signal, wherein said input terminal of a first voltage multiplier is coupled to a clock signal, a magnitude of said first clock signal is a multiple of that of said second clock signal, said second output terminal of a respective one of said voltage multipliers, excluding a last one thereof, is coupled to said input terminal of a downstream voltage multiplier, and said first output terminal of said respective one of said voltage multipliers is coupled to said control terminal of a respective one of said voltage-boosting stages, wherein each of said voltage multipliers comprises:
  an inverting amplifier having an input terminal as said input terminal of said voltage multiplier and an output terminal as said second output terminal of said voltage multiplier;
  a first P-type MOS transistor having a gate terminal, a first conducting terminal, and a second conducting terminal, wherein said first conducting terminal is coupled to a power source;
  a second P-type MOS transistor having a gate terminal coupled to said input terminal of said voltage multiplier, a first conducting terminal coupled to said second conducting terminal of said first P-type MOS transistor, and a second conducting terminal coupled to said first output terminal of said voltage multiplier;
  a capacitor coupled to said second conducting terminal of said first P-type MOS transistor and said output terminal of said inverting amplifier; and
  an N-type MOS transistor having a gate terminal coupled to said input terminal of said voltage multiplier, a first conducting terminal coupled to said gate terminal of said first P-type MOS transistor and said second conducting terminal of said second P-type MOS transistor, and a second conducting terminal.

2. A circuit according to claim 1 wherein said first clock signal and said respective input clock signal, coupled to said respective voltage multiplier, are two out-of-phase signals.

3. A circuit according to claim 1 wherein said second clock signal and said respective input clock signal, coupled to said respective voltage multiplier, are two out-of-phase signals.

4. A circuit according to claim 1 wherein each of said voltage-boosting stages comprises:
  a switching circuit having a first signal terminal, a second signal terminal, and a control terminal, wherein said second signal terminal is coupled to said first signal terminal of a downstream switching circuit; and
  an energy storage circuit having a first terminal coupled to said first signal terminal and a second terminal as said control terminal of said respective one of said voltage-boosting stages.

5. A circuit according to claim 4 wherein said switching circuit comprises an N-Type MOS (Metal-Oxide-Semiconductor) transistor.

6. A circuit according to claim 4 wherein said energy storage circuit comprises a capacitor.

7. A circuit according to claim 1 wherein each of said voltage-boosting stages comprises a MOS transistor having a gate coupled to a drain for forming a diode-coupled transistor.

8. A circuit according to claim 1 wherein each of said voltage multipliers is a voltage doubler.

9. A method for controlling a charge pump circuit to generate a boosted voltage on an output node of said charge pump circuit, said charge pump circuit having an input node coupled to a voltage, a plurality of voltage-boosting stages, each of which includes a supply terminal, a control terminal and an output terminal, coupled in series between said input and output nodes, and a plurality of voltage multipliers to control said voltage-boosting stages, wherein said method comprises the steps of:

applying a respective clock signal to an input terminal of each of said voltage multipliers;

switching said respective clock signal into a respective first clock signal for being coupled to said control terminal of a respective voltage-boosting stage;

switching said respective clock signal into a respective second clock signal; and coupling said respective second clock signal to said input terminal of a respective voltage multiplier, wherein each of said voltage multipliers comprises:

an inverting amplifier having an input terminal as said input terminal of said voltage multiplier and an output terminal as a second output terminal of said voltage multiplier;

a first P-type MOS transistor having a gate terminal, a first conducting terminal, and a second conducting terminal, wherein said first conducting terminal is coupled to a power source;

a second P-type MOS transistor having a gate terminal coupled to said input terminal of said voltage multiplier, a first conducting terminal coupled to said second conducting terminal of said first P-type MOS transistor, and a second conducting terminal coupled to said first output terminal of said voltage multiplier;

a capacitor coupling to said second conducting terminal of said first P-type MOS transistor and said output terminal of said inverting amplifier; and an N-type MOS transistor having a gate terminal coupled to said input terminal of said voltage multiplier, a first conducting terminal coupled to said gate terminal of said first P-type MOS transistor and said second conducting terminal of said second P-type MOS transistor, and a second conducting terminal.

10. A method according to claim 9 wherein said first clock signal and said respective input clock signal, coupled to said respective voltage multiplier, are two out-of-phase signals.

11. A method according to claim 9 wherein said second clock signal and said respective input clock signal, coupled to said respective voltage multiplier, are two out-of-phase signals.

* * * * *